(12) United States Patent
Peterson

(10) Patent No.: US 10,321,636 B2
(45) Date of Patent: Jun. 18, 2019

(54) VEGETATION TRIMMING APPARATUS

(71) Applicant: ECHO INCORPORATED, Lake Zurich, IL (US)

(72) Inventor: Brent Peterson, Buffalo Grove, IL (US)

(73) Assignee: Echo Incorporated, Lake Zurich, IL (US)

( * ) Notice: Subject to any disclaimer, the term of this patent is extended or adjusted under 35 U.S.C. 154(b) by 232 days.

(21) Appl. No.: 15/358,281

(22) Filed: Nov. 22, 2016

(65) Prior Publication Data

US 2018/0139906 A1 May 24, 2018

(51) Int. Cl.
*A01G 3/053* (2006.01)

(52) U.S. Cl.
CPC .................... *A01G 3/053* (2013.01)

(58) Field of Classification Search
CPC ...... A01G 3/047; A01G 3/0475; A01G 3/053; A01G 3/0535
USPC .................... 30/196, 208–210, 215, 221–223
See application file for complete search history.

(56) References Cited

U.S. PATENT DOCUMENTS

| | | | | |
|---|---|---|---|---|
| 2,268,221 A * | 12/1941 | Mischker | ............... | A01G 3/053 30/216 |
| 2,498,564 A * | 2/1950 | Maxant | ................. | A01G 3/047 30/208 |
| 2,522,070 A * | 9/1950 | St. Germain | ........... | A01G 3/00 30/208 |
| 2,645,850 A * | 7/1953 | Sejman et al. | ......... | B26B 13/28 30/268 |
| 2,748,477 A * | 6/1956 | Smith | .................... | A01G 3/047 30/208 |
| 2,787,111 A * | 4/1957 | Templeton | ........... | A01D 34/135 56/297 |
| 2,964,845 A * | 12/1960 | Dooling | ............... | A01G 3/0535 30/216 |
| 3,161,954 A * | 12/1964 | Riley, Jr. et al. | ...... | A01G 3/053 30/224 |
| 3,170,237 A * | 2/1965 | Weidauer | ............... | B26B 13/10 30/230 |
| 3,193,925 A * | 7/1965 | Hawley | .................. | A01G 3/053 30/210 |
| 3,293,746 A * | 12/1966 | Maxson | ................. | A01G 3/053 30/223 |
| 3,422,531 A * | 1/1969 | Lill et al. | ............... | A01G 3/053 30/210 |
| 3,747,212 A * | 7/1973 | Krayl | ..................... | B26B 19/06 30/221 |
| 3,897,630 A * | 8/1975 | Glover | ................... | A01G 3/053 30/220 |

(Continued)

*Primary Examiner* — Jason Daniel Prone
(74) *Attorney, Agent, or Firm* — Wood, Phillips, Katz, Clark & Mortimer

(57) ABSTRACT

A vegetation trimming assembly has at least one cutting blade with a cutting edge that moves guidingly within a blade working space between facing first and second fixed surfaces. The first surface is defined in part by a body with a fixed shape, including a head and a stepped diameter shank with a larger diameter portion to guide movement of the one cutting blade and a smaller diameter portion that is threaded to engage a support defining the second surface. The body is selectively turned in opposite directions to thereby increase and decrease a depth of the blade working space.

19 Claims, 3 Drawing Sheets

(56) References Cited

U.S. PATENT DOCUMENTS

| | | | | |
|---|---|---|---|---|
| 3,902,243 A * | 9/1975 | Klebe, Jr. | ............... | A01G 3/053 30/220 |
| 3,909,943 A * | 10/1975 | Buschman | ............. | A01G 3/053 30/216 |
| 4,216,582 A * | 8/1980 | Paule | .................... | A01G 3/053 30/223 |
| 4,251,916 A * | 2/1981 | Linden | ................... | B26B 13/28 30/268 |
| 5,075,972 A * | 12/1991 | Huang | .................. | A01G 3/053 30/223 |
| 5,082,387 A * | 1/1992 | DeVries | ................. | F16B 39/24 403/146 |
| 5,373,641 A * | 12/1994 | Ohkanda | ............... | A01G 3/053 30/216 |
| 5,984,602 A * | 11/1999 | Park | ..................... | F16B 39/284 411/154 |
| 5,987,753 A * | 11/1999 | Nagashima | ............ | A01G 3/053 30/223 |
| 6,415,515 B1 * | 7/2002 | Wheeler | ................ | A01G 3/053 30/208 |
| 6,594,879 B2 * | 7/2003 | Wheeler | ................ | A01G 3/053 29/525.02 |
| 6,910,276 B2 * | 6/2005 | Huang | ................... | A01G 3/053 30/216 |
| 7,406,770 B2 * | 8/2008 | Mace | .................... | A01D 34/14 30/216 |
| 7,603,781 B1 * | 10/2009 | Szoke, Jr. | .............. | A01G 3/053 30/208 |
| 7,757,405 B2 * | 7/2010 | Peterson | ................ | A01G 3/053 30/220 |
| 8,028,423 B2 * | 10/2011 | Matsuo | .................. | A01G 3/053 30/220 |
| 8,974,164 B2 * | 3/2015 | Benedetti | ............... | F16B 33/006 411/186 |
| 2002/0182031 A1 * | 12/2002 | Anderson | ................ | F16B 5/02 411/533 |
| 2008/0134521 A1 * | 6/2008 | Hanada | .................. | A01G 3/053 30/173 |
| 2010/0154227 A1 * | 6/2010 | Heinzelmann | ......... | A01G 3/053 30/223 |
| 2013/0326885 A1 * | 12/2013 | Kaupp | ................... | A01G 3/053 30/208 |
| 2018/0206410 A1 * | 7/2018 | Liu | ........................ | A01G 3/053 |

* cited by examiner

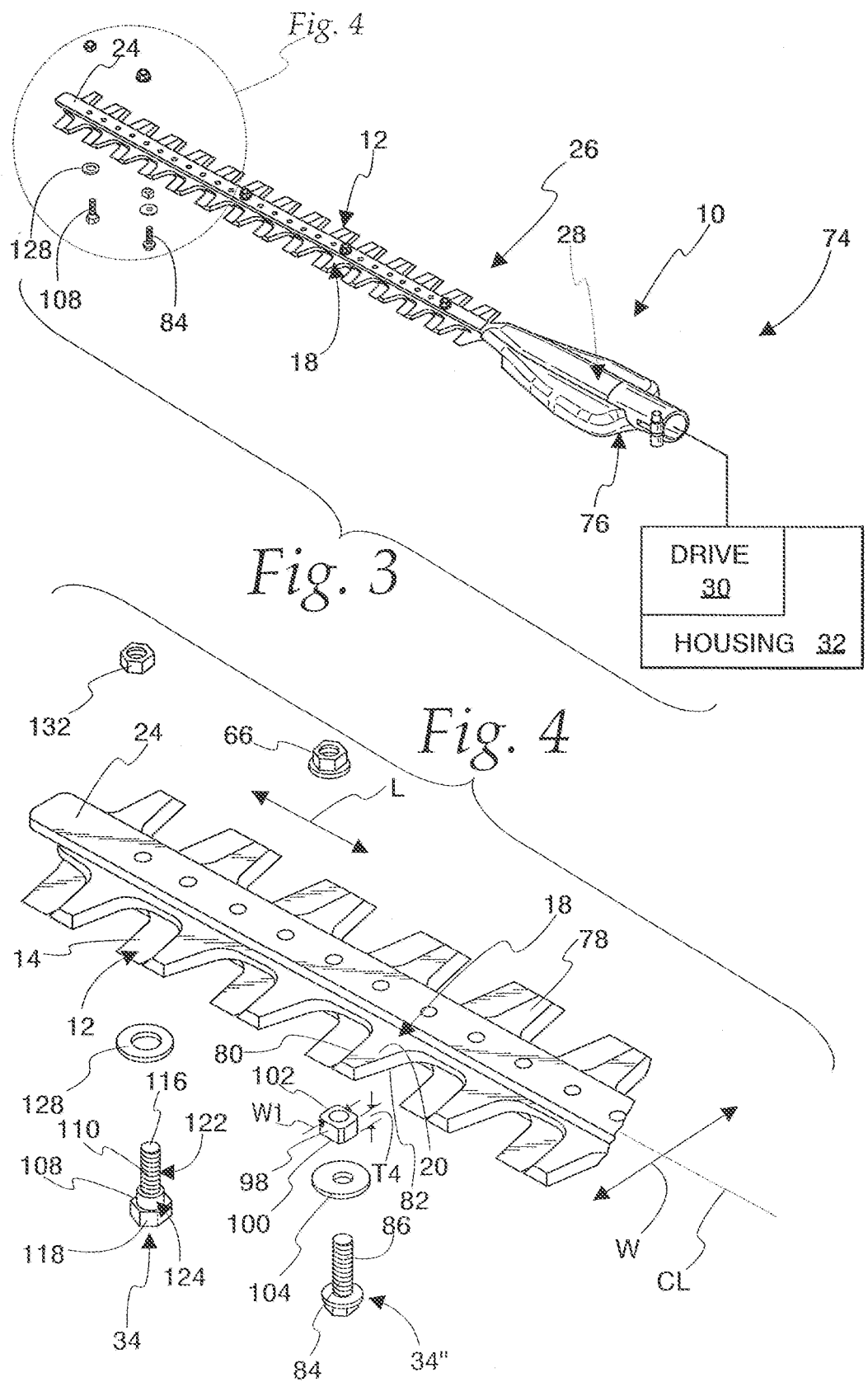

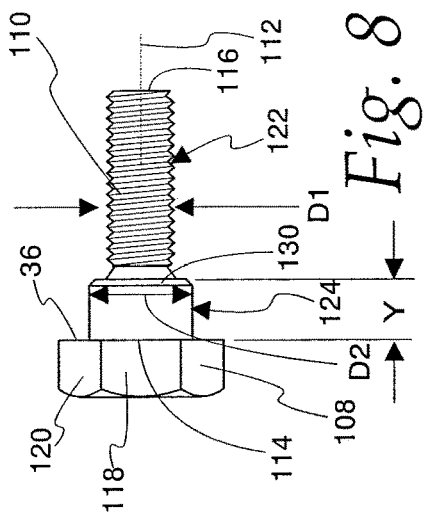
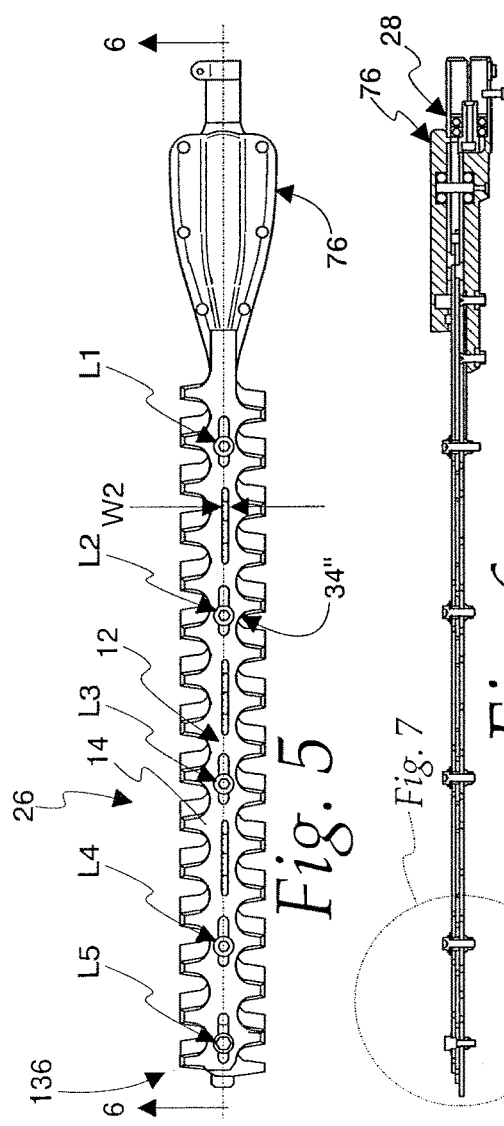
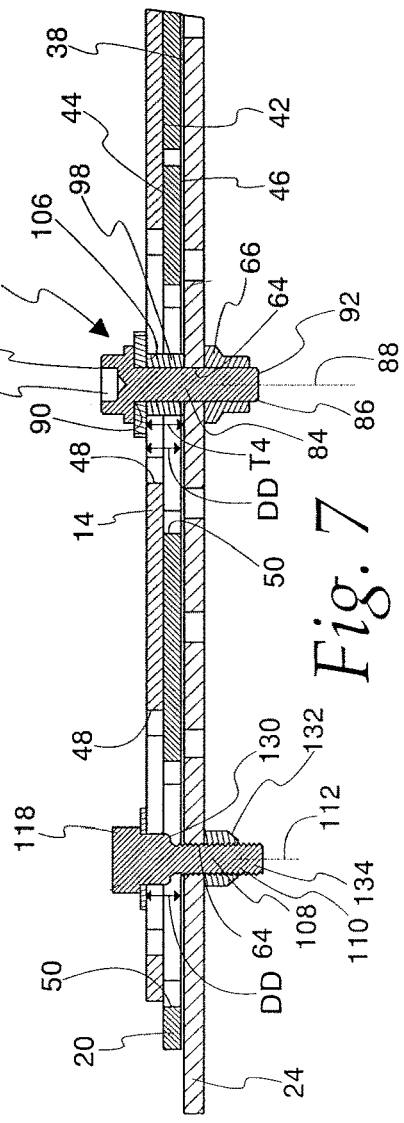
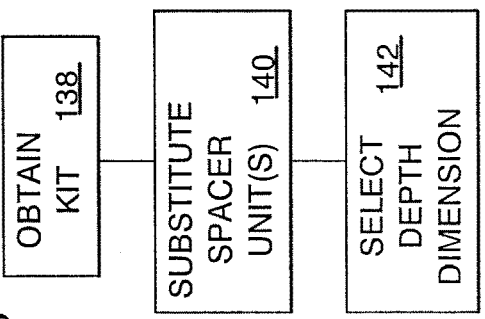

VEGETATION TRIMMING APPARATUS

BACKGROUND OF THE INVENTION

Field of the Invention

This invention relates to vegetation trimming apparatus and, more particularly, to a vegetation trimming apparatus having at least one cutting blade with a cutting edge that is moved in a reciprocating path to effect severance of vegetation.

Background Art

One well-known and successful design of vegetation trimming apparatus uses a pair of reciprocating, elongate cutting blades. Each of the cutting blades has a cutting edge. As the cutting blades move, the cutting edges cooperate to produce a scissors-type action that severs vegetation.

The cutting blades are carried on a support that projects in cantilever fashion from a frame upon which a housed drive is mounted. The housing is of a construction that a user can conveniently grasp and manipulate the same to effect controlled cutting.

The blades move within a working space between two fixed surfaces that face each other. One of the surfaces is defined by the support, with the other surface defined cooperatively by a plurality of spacer units that are provided at locations at regular intervals along the blade length. Each spacer unit is made up of a body with a head and a threaded shank. Each head has an annular surface portion that is defined at the transition between the head and shank and bounds the blade working space either directly or indirectly, in the event that a washer is placed against the head.

The shanks each extend through registered slots in the separate blades. The slots extend lengthwise of the blade. Through this arrangement, the blades can be translated back and forth in a path that aligns generally with the length of the blades with the shanks guiding this movement.

The blades are designed with a uniform thickness so that they together occupy a combined thickness that is slightly less than the spacing between the aforementioned fixed surfaces bounding the blade working space. This allows facing surfaces on the blades and support to be slid guidingly, one against the other, as the trimming apparatus is operated.

Different structures have been utilized to maintain the depth of the working space between the fixed surfaces. In one form, headed spacer unit bodies are directed through the blades and threaded into the support. By turning the bodies, the heads can be drawn towards the support surface. By initially fully tightening the bodies and thereafter turning the same in a loosening direction, a slight gap can be created and maintained to allow guided, but relatively unimpeded, relative movement between the blades and support.

It is also known to make spacer units with a spacer block through which a shank extends. The spacer block becomes captive between a head and the support so that the depth of the blade working space is determined by the thickness of the block. The use of the blocks allows a relatively small diameter shank to be utilized while at the same time consistently maintaining a predetermined depth for the working space without requiring any judgment or adjustment on the part of the manufacturer or user.

Because the blades and support have surfaces that are guided, one against the other, the blades are prone to wearing through frictional abrasion. As a result, the thicknesses of the blades may vary, as a result of which they fit loosely within the depth of the blade working space. This may cause vibration as the unit is operated and further may result in improper alignment of the cutting edges so that the cutting ability of the apparatus is compromised. This condition could cause blade jamming and potentially parts failure.

Typically, the abrasive wear is non-uniform over the length of the blades. The free end region is more prone to wearing, and thus the blades tend to thin more extensively thereat.

Parts and kits are offered to users of this type of apparatus to allow them to locally change the depth of the blade working space once this wear occurs. For example, spacer blocks may be provided with a reduced thickness and can be substituted for the originally assembled spacer blocks in the regions where there is appreciable wear. This approach is effective only if the replaced spacer blocks can be substituted for by spacer blocks with the appropriate thickness. If only a single replacement block thickness is available, it may not be matched to the new combined thickness of the worn blades. If multiple blocks are offered with different thicknesses, a user may have to use a trial and error process to select the appropriate block.

An additional problem with this construction is that one or more washers may additionally have to be provided as part of the spacer unit. Thus, a user must handle and assemble multiple parts, which may become inconvenient to the point that a user will forego any modification of the trimming apparatus and use the same with the blades significantly worn. This may give the user a bad perception of the product, which may cut ineffectively and eventually fail due to the play that results from the thinning of the blades.

The industry continues to seek designs that are not only effective at time of initial construction, but which can be simply modified by a user to allow optimal operation through the anticipated lifetime of the apparatus.

SUMMARY OF THE INVENTION

In one form, the invention is directed to a vegetation trimming assembly having: a first cutting blade assembly; a second cutting blade assembly; a support assembly; a transmission assembly; and a plurality of spacer units. The first cutting blade assembly has a first cutting edge on at least a first body. The first body has a thickness between opposite sides. The second cutting blade assembly has a second cutting edge on at least a second body. The second body has a thickness between opposite sides. The first and second cutting blade assemblies and support assembly make up a cutting unit that is configured so that at least one of the first and second bodies is guided in movement in a reciprocating path relative to the support assembly and the other of the first and second bodies as an incident of which the first and second cutting edges cooperate to produce a cutting action. The at least one of the first and second bodies has an elongate slot. The transmission assembly causes the at least one of the first and second bodies to be moved in the reciprocating path in response to an input from a drive. The plurality of spacer units collectively define a first surface that faces a second surface on the support assembly. The first and second surfaces are spaced from each other by a depth dimension whereby a blade working space is defined between the first and second surfaces. At least one of the spacer units has a first body with a fixed shape. The first body has a first shank with an axis and first and second axially spaced ends. The first body has a first head at the first end. The first shank has a stepped diameter including a threaded portion with a first diameter and a guide portion between the threaded portion and the first head with a diameter greater than the first diameter. The guide portion extends into the elongate slot and guides movement of the at least one of the first and second bodies in the reciprocating path. The first head defines a surface facing axially towards the second end of the first body and extending radially beyond the guide portion. The cutting unit has a first threaded receptacle engaged with the threaded portion of the first shank such that turning of the first body around its axis in one direction causes the first shank to advance axially within the first threaded receptacle, as an incident of which the axially facing surface on the first head moves towards the second surface on the support assembly to thereby locally reduce the depth dimension of the blade working space.

In one form, the other of the first and second bodies has an elongate slot through which the guide portion extends. The cutting unit is configured so that the other of the first and second bodies is guided in movement in a reciprocating path relative to the support assembly and the one of the first and second bodies.

In one form, another of the spacer units has a second body with a fixed shape. The second body has a second shank having an axis and first and second axially spaced ends. The second body has a second head at its first end. The second shank has a substantially constant diameter between the second head and the second end of the second shank. The another spacer unit further includes a spacer block with a thickness through which the second shank extends. The cutting unit further includes a second threaded receptacle engaged with the threaded portion of the second shank such that turning of the second body around its axis in one direction causes the second shank to advance axially within the second threaded receptacle, as an incident of which the second head moves towards the second surface so that the thickness of the spacer block is fixedly captured between the second head and the second surface to thereby set a depth dimension of the blade working space where the another spacer unit is located.

In one form, the first threaded receptacle is defined in the support assembly. A separate nut is threaded against the first shank to fix the first body.

In one form, the diameters of the threaded portions of the first and second shanks are the same.

In one form, the diameter of the threaded portions of the first and second shanks is on the order of 5 mm.

In one form, the diameter of the guide portion of the first shank is at least 1 mm greater than the diameter of the threaded portion of the first shank.

In one form, the one spacer unit further includes a washer. The first shank extends through the washer so that the washer abuts to the first head.

In one form, there is a first axially facing shoulder at a location where the first shank transitions between the guide portion and the threaded portion. With the one spacer unit operatively connected, the shoulder abuts to the second surface.

In one form, there is a first axially facing shoulder at a location where the first shank transitions between the guide portion and the threaded portion. With the one spacer unit operatively connected, the shoulder is spaced from the second surface.

In one form, the nut is a lock nut.

In one form, the vegetation trimming assembly is provided in combination with a drive unit configured to generate an input to the transmission assembly that causes the at least one of the first and second bodies to be moved in its reciprocating path.

In one form, the vegetation trimming assembly is provided in combination with a drive unit configured to generate an input to the transmission assembly that causes the at least one of the first and second bodies to be moved in its reciprocating path. The cutting unit has a length with first and second ends spaced in a lengthwise direction and projects in cantilever fashion away from the drive unit. The first end of the cutting unit is closer to the drive unit than is the second end of the cutting unit and the at least one spaced unit is closer to the second end of the cutting unit than is the another spacer unit.

In one form, the plurality of spacer units further includes an additional spacer unit having the same construction as the another spacer unit and located between the another spacer unit and the first end of the cutting unit.

In one form, opposite sides of first and second of the bodies are substantially flat. One of the flat sides on the first body slides guidingly against one of the flat sides of the second body as the at least one of the first and second bodies moves in its reciprocating path.

In one form, the plurality of spacer units is at least four spacer units.

In one form, the vegetation trimming assembly is configured so that the at least one and another spacer units are interchangeably usable, one in place of the other.

In one form, the invention is directed to a kit consisting of: a cutting unit and transmission assembly as recited above; a first plurality of spacer units having the configuration of the another spacer unit described above and operatively connected to the cutting unit; and a spacer unit having the configuration of the at least one spacer unit described above. The cutting unit and the spacer unit, having the configuration of the at least one spacer unit, are configured so that the spacer unit having the configuration of the at least one spacer unit can be operatively connected in place of one of the plurality of spacer units having the configuration of the another spacer unit.

In one form, the invention is directed to a method of maintaining a vegetation trimming assembly. The method includes the steps of: obtaining the kit described above wherein all of the spacer units operatively connected to the cutting unit have the configuration of the another spacer unit: substituting one of the spacer units having the configuration of the at least one spacer unit for one of the operatively connected spacer units having the configuration of the another spacer unit; and turning the first body to select a desired depth dimension of the blade working space.

In one form, the cutting unit has a free end. The one of the spacer units that substitutes for one of the operatively connected spacer units substitutes for the operatively connected spacer unit that is the closest to the free end of the cutting unit.

BRIEF DESCRIPTION OF THE DRAWINGS

FIG. 3 is a partially exploded, partially schematic, top perspective view of one form of vegetation trimming assembly, as shown schematically in FIG. 1;

FIG. 4 is an enlarged view of the portion of the vegetation trimming assembly within the circle in FIG. 3;

FIG. 5 is a bottom view of the vegetation trimming assembly in FIG. 3;

FIG. 6 is a cross-sectional view of the vegetation trimming assembly taken along line 6-6 of FIG. 5;

FIG. 7 is an enlarged view of the portion of the vegetation trimming assembly within the circle in FIG. 6;

FIG. 8 is an enlarged view of a body on an inventive spacer unit on the vegetation trimming assembly in FIGS. 3-7; and FIG. 9 is a flow diagram representation of a method of maintaining a vegetation trimming assembly, according to the invention.

DETAILED DESCRIPTION OF THE PREFERRED EMBODIMENT

Figure 1:
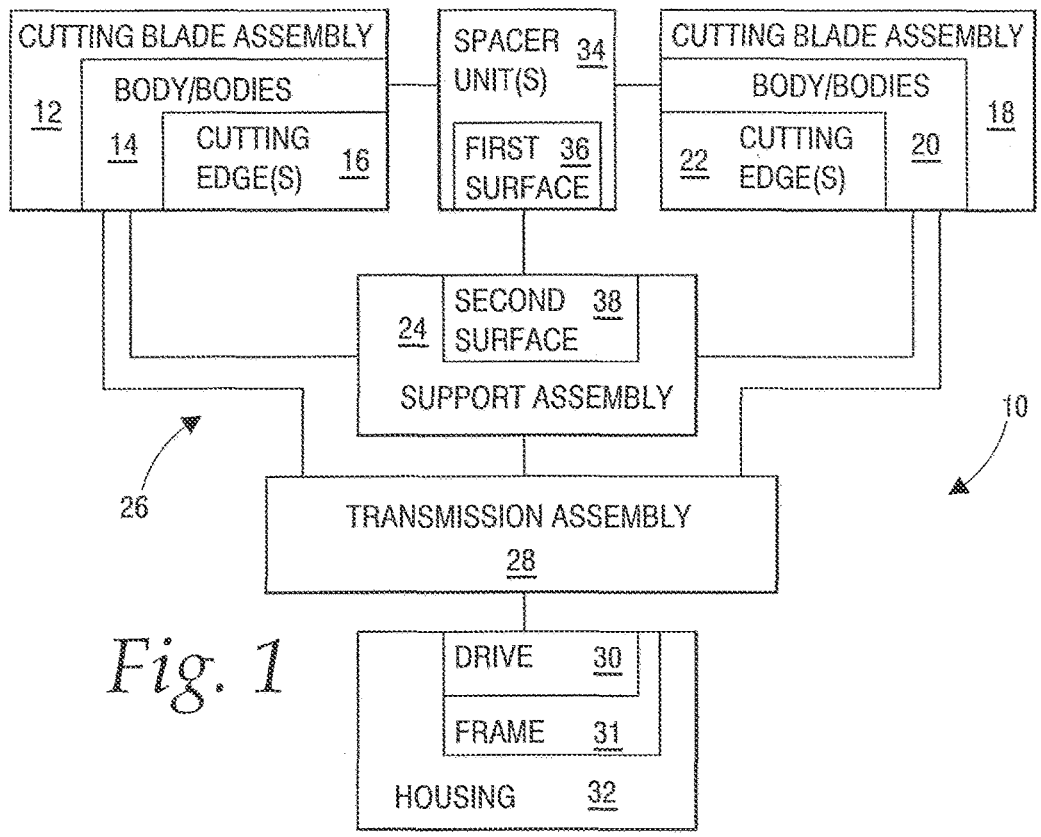
FIG. 1 is a schematic representation of a vegetation trimming apparatus incorporating a vegetation trimming assembly, according to the present invention, and including a cutting unit and transmission assembly for operating the cutting unit in response to an input from a drive.

In FIG. 1, a schematic representation of a vegetation trimming assembly, according to the present invention, is shown at 10. The vegetation trimming assembly 10 has a cutting blade assembly/unit 12 with at least one body 14 on which at least one cutting edge 16 is formed.

A separate cutting blade assembly/unit 18 has at least one body 20 defining one or more cutting edges 22.

The cutting blade assemblies 12, 18 are carried on a support assembly/unit 24. The cutting blade assemblies 12, 18 and support assembly 24 together make up at least part of a cutting unit at 26.

The cutting unit 26 is configured so that at least one of the bodies 14, 20 is guided in movement in a reciprocating path relative to the support assembly 24 and the other of the bodies 14, 20, as an incident of which the cutting edges 16, 22 cooperate to produce a cutting action.

A transmission assembly 28 causes at least one of the bodies 14, 20 to be moved in its reciprocating path in response to an input from a drive 30 for the cutting blade assembly 10. The drive 30 is supported on a frame 31 and integrated into a housing 32 which is configured to be held and repositioned by an operator so that the cutting unit 26 can be strategically advanced and reoriented relative to different configurations of vegetation to effect the desired controlled severance of portions of that vegetation.

A plurality of spacer units 34 collectively act as a first surface 36 that faces a second surface 38 on the support assembly 24. The first and second surfaces 36, 38 are spaced from each other by a depth dimension, whereby a blade working space is defined therebetween.

The generic showing in FIG. 1 is intended to encompass a wide range of configurations for trimming apparatus, made up of the trimming assembly 10 and drive 30, into which the present invention can be incorporated. The schematic showing of parts is intended to encompass numerous variations of those components and their interactions. The exemplary forms shown hereinbelow are exemplary in nature only.

Figure 2:
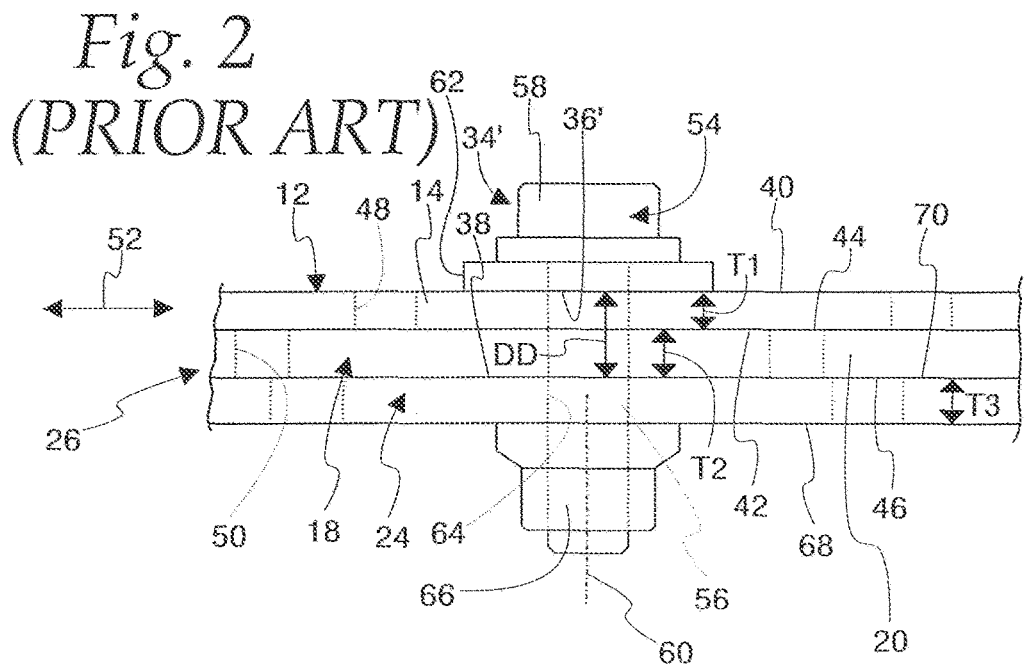
FIG. 2 is a fragmentary, cross-sectional view of a conventional spacer unit used to selectively control the depth of a working space between which cooperating bodies on cutting assemblies reside and move guidingly against and relative to each other.

In FIG. 2, one prior art spacer unit, as discussed in the Background Art section herein, is shown at 34'.

The cutting unit 26 in FIG. 2 is made up of the aforementioned cutting blade assembly 12, cutting blade assembly 18, and support assembly 24. The cutting blade assembly 12 includes the body 14 which has a first thickness T1 between opposite flat sides 40, 42. The cutting blade assembly 18 has the aforementioned body 20 that has a thickness T2 between opposite sides 44, 46. The bodies 14, 20 respectively have registrable elongate slots 48, 50, the structure and function of which will be described in greater detail below.

The bodies 14, 20 are operatively situated by placing the surface 42 of the body 14 against the surface 44 of the body 20. The surface 46 of the body 20 is placed against the second surface 38 on the support assembly 24.

A plurality of the spacer units 34' (one shown) collectively act as the first surface 36' that faces the second surface 38. The first and second surfaces 36', 38 are spaced from each other by a depth dimension DD to define a blade working space between the surfaces 36', 38. The depth dimension DD is set to be slightly greater than the combined thicknesses T1, T2 of the bodies 14, 20 to allow the bodies 14, 20 to move against and relative to each other in paths parallel to the planes of the surfaces 40, 42, 44, 46, as indicated by the double-headed arrow 52.

Each of the spacer units 34' is constructed so that the depth dimension DD can be changed. More specifically, each spacer unit 34' consists of a bolt 54 with a threaded shank 56 having an associated head 58 through which the shank 56 can be turned around its longitudinal axis 60. The head 58 defines the portion of the surface 36', For purposes of simplicity herein, the surface 36' will be characterized as being defined by the head 58 even when, as depicted, a washer 62 is placed against the head 58 and actually defines the surface 36'.

The shank 56 is directed through the registered slots 48, 50 and a threaded receptacle/bore 64 through the support assembly 24 and is exposed to be threadably connected to a lock nut 66 on a side 68 of the support assembly 24 facing oppositely to a flat side 70 on the support assembly 24, defining the surface 38 and abutting the facing side/surface 46 on the body 20. The shank 56 is threaded into the receptacle/bore 64 whereby the head 58 and support assembly 24 have a fixed relationship, which thereby fixes the depth dimension DD therebetween. Turning of the head 58 in one direction around the axis 60 diminishes the depth dimension DD whereas opposite turning increases the same. Once the desired depth dimension DD is selected, the lock nut 66 can be tightened to secure this relationship of parts, which might otherwise tend to change as when vibration is encountered during operation.

To select the appropriate depth dimension DD that allows the bodies 14, 20 and support assembly 24 to shift smoothly relative to each other, the bolt 54 is tightened to draw the bodies 14, 20 and support assembly 24 tightly against each other. Thereafter, the bolt 54 is turned a predetermined amount in a loosening direction to create a slight gap that facilitates proper operation.

After extended operation, the movement of the bodies 14, 20 and support assembly 24 against and relative to each other causes progressive abrasive wear that effectively reduces the combined thicknesses T1, T2 as well as the thickness T3 of the support assembly 24. As a result, the bodies 14, 20 may not be precisely guided relative to each other within the blade working space. This may compromise their cutting capability, produce vibration, cause jamming and/or eventually lead to a failure of parts. Thus, the user may have to periodically tighten the bolt 54 to reduce the depth dimension DD to accommodate this part reconfiguration.

With this existing construction, the shank 56 has a uniform diameter which is required to be relatively large to perform the guiding function within the slots 48, 50. For example, the bolt shank 56 may be on the order of 6 millimeters.

It should be noted that while the known form in FIG. 2, and the inventive embodiments described hereinbelow, show that both bodies 14, 20 move in reciprocating paths during operation, the invention contemplates incorporation into trimming apparatus wherein only one of the bodies is required to move. In that event, the moving body has either a slot or a fixed body to move in a slot on another component. These alternatives involve equivalent structures wherein parts are simply reversed.

Referring now to FIGS. 3-8, a vegetation trimming apparatus, according to the invention, is shown at 74 and made up of the inventive vegetation trimming assembly 10 and the aforementioned drive 30 integrated into the housing 32.

In this embodiment, the cutting unit 26 is connected to a housing 76 into which the transmission assembly 28 is integrated. A suitable form for the cutting unit 26, housing 76, and transmission assembly 28 is shown in U.S. Pat. No. 7,757,405, commonly assigned herewith. The entire disclosure in U.S. Pat. No. 7,757,405 is incorporated herein by reference. Accordingly, only the detail necessary to understand the invention will be described hereinbelow.

The cutting blade assemblies 12, 18 respectively have bodies 14, 20 with substantially the same construction. The exemplary body 20 is formed from a flat blank with a length dimension in the direction of the double-headed arrow L and a width dimension in the direction of the double-headed arrow W. A plurality of truncated triangular teeth 78 project oppositely from the lengthwise center line CL of the body 14 at regular intervals along the full length thereof. This produces a scalloped arrangement at each side of the center line CL, with the teeth 78 each having a forwardly facing cutting edge portion 80 and a rearwardly facing cutting edge portion 82. The teeth 78 are in lengthwise staggered relationship on opposite sides of the center line CL.

The body 14 has substantially the same configuration but is inverted to be assembled to the body 20.

The bodies 14, 20 and support assembly 24 are stacked in the same manner as shown in FIG. 2. That is, the flat side 42 of the body 14 is placed facially against the flat side 44 of the body 20. The side 46 of the body 20, facing oppositely to the side 44, is placed facially against the second surface 38 defined by the support assembly 24. In this relationship, the elongate slots 48 in the body 14 register with slots 50 in the body 20.

In the depicted embodiment, there are five registered slot pairs 48, 50, each at which a spacer unit is provided to maintain the required aforementioned depth dimension DD thereat. Because the bodies 14, 20 and support assembly 24 are flexible, different depth dimensions DD can be set at the various locations at which the spacer units are provided.

In the depicted embodiment, there are five locations L1, L2, L3, L4, and L5 at which spacer units 34, 34" are operatively connected. A known form of spacer unit 34" is shown at each of the locations L1, L2, L3, L4. Each of the spacer units 34" consists of a body 84 with a fixed shape. The body has a shank 86 with an axis 88 and axially spaced first and second ends 90, 92. A head 94 is provided at the first shank end 90. The shank 86 has a substantially constant diameter between the head 94 and the second end 92. The shank 86 is threaded, at least from the second end 92 over a portion of the axial length thereof. The head 94 has a fitting 96 to accommodate a conventional tool that can be used to turn the body 84 around the axis 88.

The spacer unit 34" further includes a spacer block 98 with a thickness T4. The spacer block 98 has a generally squared shape with the thickness T4 defined between oppositely facing surfaces 100, 102. The spacer block 98 has a width W1 at least nominally matched to the width dimension W2 of the slots 48, 50.

To operatively connect the spacer unit 34", the shank 86 is directed through an optional spacing washer 104 and the thickness of the spacer block 98 with the spacer block 98 nested in the registered slots 48, 50. The shank 86 is advanced into the threaded bore/receptacle 64 in the support assembly 24. By turning the body 84 around the axis 88 in a tightening direction, the shank 86 advances within the bore/receptacle 64 as an incident of which the head 94 moves towards the second surface 38. The thickness T4 is selected so that with the body 84 tightened, the spacer block 98 is fixedly maintained between the second surface 38 and a surface 106 on the head 94 that is actually defined by the spacing washer 104 and makes up part of the surface 36, 36". The depth dimension DD is thus positively set and equal to the spacer block thickness T4 that is fixedly captured between the head 94 and the second surface 38. The thickness T4 is selected so that a slight gap is maintained that allows guided, but substantially unimpeded, relative movement between the bodies 14, 20 and support assembly 24 as the bodies 14, 20 are translated guidingly in their respective reciprocating paths. The lock nut 66 further secures the body 84.

Heretofore, in the event that there is wear of the bodies 14, 20 and/or support assembly 24 that reduces the combined thickness of the bodies 14, 20 or creates an enlarged gap, the body 84 would be loosened and removed to allow separation of the spacer block 98. A substitute spacer block would then be used with an appropriate reduced thickness to allow the depth dimension DD to be reduced when the body 84 is tightened.

To effect the change in the spacer block 98, a number of separate parts must be handled. This is inconvenient for users, particularly those who are not mechanically skilled.

Further, for the substituted spacer block 98 to perform effectively, its respective thickness must be matched to the desired depth dimension DD. This potentially requires a user to have on hand a number of spacer blocks 98 with different thicknesses that might be substituted and tested on a trial and error basis until the appropriate one is arrived at. Aside from the inconvenience of having to have a number of spacer blocks 98 on hand, it may be that the available spacer blocks are either too thick or too thin. In the former case, the spacer block 98 would have to be filed or ground to arrive at the desired thickness. In the latter case, there is no practical way to incorporate the spacer block to set the optimal depth dimension short of attempting to stack at least one additional washer or shim on the block.

The spacer unit 34 may be constructed to address one or more of the above problems. The spacer unit 34, as incorporated at the location L5, consists of a body 108 with a fixed shape that may be formed as one piece or multiple pieces permanently combined. The body 108 has a shank 110 having an axis 112 and axially spaced first and second ends 114, 116, respectively.

A head 118 is provided at the first end 114 and has a polygonally-shaped perimeter surface 120 to be engaged by a conventional wrench.

The shank 110 has a stepped diameter including a threaded portion at 122 with a first diameter D1 and a guide portion at 124 between the threaded portion 122 and the head 118. The guide portion 124 has a diameter D2 that is greater than the diameter D1.

The head 118 defines a portion of the first surface 36. The surface portion is depicted as an annular shape that faces axially toward the second end 116. The portion of the surface 36 defined by the head 118 extends radially beyond the guide portion 124.

The body 108 is directed through an optional spacing washer 128 that extends over the guide portion 124 to against the head 118. The shank 110 is directed through the registered slots 48, 50 and engaged with the threaded bore/receptacle 64 in the support assembly 24. The body 108 can be turned in one direction around the axis 112 to advance the shank 110 through the bore/receptacle 64. Continued tightening of the body 108 draws the head 118 towards the support assembly 24 to thereby reduce the depth dimension DD.

An annular shoulder/surface 130 is defined at a transition between the threaded portion 122 and guide portion 124. The surface 130 faces the second end 116.

The spacer unit 34 can be designed to perform in different ways. As depicted in FIG. 7, the operatively connected spacer unit 34 may be designed so that the surface 130 is spaced from the second surface 38 on the support assembly 24. The depth dimension can thus be set by first tightening the body 108 to fix the bodies 14, 20 and support assembly 24 against each other, whereupon the body 108 can thereafter be turned in a loosening direction to produce a desired increase in the depth dimension that allows free relative movement between the bodies 14, 20 and support assembly 24.

Alternatively, the axial dimension of the guide portion, identified at Y in FIG. 8, may be selected so that the shoulder 130 abuts to the support assembly 24 with the spacer unit 34 operatively connected. This requires keeping on hand bodies 108 having guide portions 124 with different axial dimensions Y in anticipation of different depth dimensions that must be set depending upon the extent of wear of the bodies 14, 20 and/or support assembly 24.

With the body 108 suitably located, a locking nut 132 can be tightened against a protruding length 134 of the threaded portion 122 of the shank 110.

Typically, the shank 86 on the spacer unit 34" will have a 5 mm thread that is less than the thread diameter on the bolt shank 56 as shown in FIG. 2. The threaded portion 122 of the body 108 can be made with the same thread size as the shank 86 on the spacer unit 34", whereby the spacer units 34, 34" are interchangeably usable at each location L1-L5.

Commonly, commercial units are sold with spacer units 34" at each of the locations L1-L5. As adjustment due to wear becomes necessary, the spacer units 34" can be replaced by the spacer unit 34. Most commonly, wear occurs to a greater extent at the free, leading end 136 of the cutting unit 26 that is remote from the drive 30 at which the cutting unit 26 is cantilever mounted. Thus, the spacer units 34" may be replaced, as necessary, normally beginning at the forwardmost location L5.

It is also contemplated that the spacer units 34 may be provided at more than one or all of the locations L1-L5 at time of manufacture or after use.

Because the diameter D2 of the guide portion 124 is greater than the diameter D1 of the threaded portion 122, the guide portion 124 performs similarly to the aforementioned spacer block 98 in terms of its positive guiding function while affording good structural integrity. As just one example, the diameter D2 may be on the order of 7.45 mm with the diameter D1 equal to 5 mm. While these precise sizes are not required, it is preferred that the diameter D2 be greater than the diameter D1 by at least 1 mm.

The cutting unit 26 and transmission assembly 28 may be offered as part of a kit with a plurality of the spacer units 34" and at least one spacer unit 34, with the spacer units 34 and 34" interchangeable.

With the kit, a method of maintaining a vegetation trimming assembly can be performed as shown in flow diagram form in FIG. 9.

As shown at block 138, the kit, described above, is obtained. The kit may be in a form wherein all of the operatively connectively spacer units have the configuration of the spacer unit 34".

As shown at block 140, at least one of the spacer units 34" is substituted for by a spacer unit 34.

As shown at block 142, the body 108 is turned to select a desired depth dimension for the blade working space.

The foregoing disclosure of specific embodiments is intended to be illustrative of the broad concepts comprehended by the invention.

The invention claimed is:

1. A vegetation trimming assembly comprising:
a first cutting blade unit having at least a first body with a first cutting edge, the first body having a thickness between opposite sides;
a second cutting blade unit having at least a second body with a second cutting edge, the second body having a thickness between opposite sides;
a support unit,
the first and second cutting blade units and support unit making up at least part of a cutting unit that is configured so that at least one of the first and second bodies is guided in movement in a reciprocating path relative to the support unit and the other of the first and second bodies as an incident of which the first and second cutting edges cooperate to produce a cutting action,
the at least one of the first and second bodies having an elongate slot;
a transmission assembly for causing the at least one of the first and second bodies to be moved in the reciprocating path in response to an input from a drive; and
a plurality of spacer units that collectively act as a first surface that faces a second surface of the support unit, the first and second surfaces spaced from each other by a depth dimension whereby a blade working space is defined between the first and second surfaces for the thickness of the at least one of the first and second bodies that is guided in the reciprocating path,
at least one of the spacer units comprising one body with a fixed shape, the one body comprising a first shank having a longitudinal axis and first and second axially spaced ends,
the one body having a first head at the first end,
the first shank having a stepped diameter including a threaded portion with a first diameter and a guide portion between the threaded portion and the first head with a diameter greater than the first diameter,
the guide portion extending into the elongate slot and guiding movement of the at least one of the first and second bodies in the reciprocating path,
the first head defining a part of the first surface facing axially towards the second end of the one body and extending radially beyond the guide portion,
the cutting unit comprising a first threaded receptacle engaged with the threaded portion of the first shank such that turning of the one body around the longitudinal axis of the one body in one direction causes the first shank to advance axially within the first threaded receptacle as an incident of which the axially facing surface of the first head moves towards the second surface of the support unit to thereby locally reduce the depth dimension of the blade working space, wherein another of the spacer units comprises a second body with a fixed shape, the second body of the another spacer unit comprising a second shank having a longitudinal axis and first and second axially spaced ends, the second body of the another spacer unit having a second head at its first end, the second shank having a substantially constant diameter between the second head and the second end of the second shank, the another spacer unit further comprising a spacer block with a thickness through which the second shank extends, the cutting unit further comprising a second threaded receptacle engaged with the threaded portion of the second shank such that turning of the second body of the another spacer unit around the longitudinal axis of the second body of the another spacer unit in one direction causes the second shank to advance axially within the second threaded receptacle as an incident of which the second head moves towards the second surface so that the thickness of the spacer block is fixedly captured between the second head and the second surface to thereby set the depth dimension of the blade working space where the another spacer unit is located.

2. The vegetation trimming assembly according to claim 1 wherein the other of the first and second cutting blade unit bodies has an elongate slot through which the guide portion extends and the cutting unit is configured so that the other of the first and second cutting blade unit bodies is guided in movement in a reciprocating path relative to the support unit and the one of the first and second cutting blade unit bodies.

3. The vegetation trimming assembly according to claim 1 wherein the first threaded receptacle is defined in the support unit and a separate nut is threaded against the first shank to fix the one body.

4. The vegetation trimming assembly according to claim 3 wherein the nut is a lock nut.

5. The vegetation trimming assembly according to claim 1 wherein the diameters of the threaded portions of the first and second shanks are the same.

6. The vegetation trimming assembly according to claim 5 wherein the diameter of the threaded portions of the first and second shanks is on the order of 5 mm.

7. The vegetation trimming assembly according to claim 1 wherein the diameter of the guide portion of the first shank is at least 1 mm greater than the diameter of the threaded portion of the first shank.

8. The vegetation trimming assembly according to claim 1 wherein the one spacer unit further comprises a washer, the first shank extending through the washer so that the washer abuts to the first head.

9. The vegetation trimming assembly according to claim 1 wherein there is a first axially facing shoulder at a location where the first shank transitions between the guide portion and the threaded portion and with the one spacer unit operatively connected the shoulder abuts to the second surface.

10. The vegetation trimming assembly according to claim 1 wherein there is a first axially facing shoulder at a location where the first shank transitions between the guide portion and the threaded portion and with the one spacer unit operatively connected the shoulder is spaced from the second surface.

11. The vegetation trimming assembly according to claim 1 in combination with a drive unit configured to generate an input to the transmission assembly that causes the at least one of the first and second cutting blade unit bodies to be moved in the reciprocating path of the at least one of the at least one of the first and second cutting blade unit bodies.

12. The vegetation trimming assembly according to claim 1 in combination with a drive unit configured to generate an input to the transmission assembly that causes the at least one of the first and second cutting blade unit bodies to be moved in the reciprocating path of the at least one of the first and second cutting blade unit bodies, wherein the cutting unit has a length with first and second ends spaced in a lengthwise direction, the cutting unit projects in cantilever fashion away from the drive unit, the first end of the cutting unit is closer to the drive unit than is the second end of the cutting unit and the at least one spacer unit is closer to the second end of the cutting unit than is the another spacer unit.

13. The vegetation trimming assembly according to claim 12 wherein the plurality of spacer units further comprises an additional spacer unit having the same construction as the another spacer unit and located between the another spacer unit and the first end of the cutting unit.

14. The vegetation trimming assembly according to claim 1 wherein the opposite sides of the first and second cutting blade unit bodies are substantially flat, one of the flat sides on the first cutting blade unit body slides guidingly against one of the flat sides of the second cutting blade unit body as the at least one of the first and second cutting blade unit bodies moves in the reciprocating path of the at least one of the first and second cutting blade unit bodies.

15. The vegetation trimming assembly according to claim 1 wherein the plurality of spacer units comprises at least four spacer units.

16. The vegetation trimming assembly according to claim 1 wherein the vegetation trimming assembly is configured so that the at least one and another spacer units are interchangeably usable, one in place of the other.

17. A kit comprising:
a cutting unit and transmission assembly as recited in claim 1;
a first plurality of spacer units having a configuration of the another spacer unit of claim 1 and operatively connected to the cutting unit; and
a spacer unit having a configuration of the at least one spacer unit of claim 1,
the cutting unit and the spacer unit, having the configuration of the at least one spacer unit, configured so that the spacer unit having the configuration of the at least one spacer unit can be operatively connected in place of one of the plurality of spacer units having the configuration of the another spacer unit.

18. A method of maintaining a vegetation trimming assembly, the method comprising the steps of:
obtaining the kit of claim 17 wherein all of the spacer units operatively connected to the cutting unit have the configuration of the another spacer unit;
substituting one of the spacer units having the configuration of the at least one spacer unit for one of the operatively connected spacer units having the configuration of the another spacer unit; and
turning the one body to select a desired depth dimension of the blade working space.

19. The method of maintaining a vegetation trimming assembly according to claim 18 wherein the cutting unit has a free end and the one of the spacer units that substitutes for one of the operatively connected spacer units substitutes for the operatively connected spacer unit that is the closest to the free end of the cutting unit.

* * * * *

UNITED STATES PATENT AND TRADEMARK OFFICE
CERTIFICATE OF CORRECTION

PATENT NO.        : 10,321,636 B2
APPLICATION NO.   : 15/358281
DATED             : June 18, 2019
INVENTOR(S)       : Brent Peterson Page 1 of 1

It is certified that error appears in the above-identified patent and that said Letters Patent is hereby corrected as shown below:

In the Claims

Column 12, Lines 1 and 2, in Claim 11, the words "at least one of the", second occurrence, should be deleted.

Signed and Sealed this
Twentieth Day of August, 2019

Andrei Iancu
*Director of the United States Patent and Trademark Office*